United States Patent
Sekiya et al.

(10) Patent No.: US 9,802,594 B2
(45) Date of Patent: Oct. 31, 2017

(54) NEGATIVE PRESSURE CONTROLLER

(71) Applicant: TOYOTA JIDOSHA KABUSHIKI KAISHA, Toyota-shi, Aichi-ken (JP)

(72) Inventors: Yoshihide Sekiya, Chiryu (JP); Yasushi Murayama, Nagakute (JP); Shoji Ozaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/231,235

(22) Filed: Aug. 8, 2016

(65) Prior Publication Data

US 2017/0088108 A1    Mar. 30, 2017

(30) Foreign Application Priority Data

Sep. 29, 2015  (JP) .................................. 2015-190784

(51) Int. Cl.
*B60T 13/72*  (2006.01)
*B60T 13/52*  (2006.01)

(52) U.S. Cl.
CPC .............. *B60T 13/72* (2013.01); *B60T 13/52* (2013.01)

(58) Field of Classification Search
CPC .......... B60T 13/46; B60T 13/52; B60T 13/56; B60T 13/563; B60T 13/565; B60T 13/72
USPC ................................ 188/356, 357; 303/114.3
See application file for complete search history.

(56) References Cited

U.S. PATENT DOCUMENTS

| | | | | |
|---|---|---|---|---|
| 5,515,676 A | * | 5/1996 | Earle ....................... | B60T 13/46 417/12 |
| 6,305,757 B1 | * | 10/2001 | Ohsaki ..................... | B60T 13/46 188/356 |
| 8,376,475 B2 | * | 2/2013 | Ruffer ..................... | B60K 6/543 303/10 |
| 2013/0057055 A1 | * | 3/2013 | Miyashita ............... | B60T 13/52 303/12 |
| 2013/0283898 A1 | * | 10/2013 | Rollinger ................ | G01M 3/26 73/114.77 |

FOREIGN PATENT DOCUMENTS

| | | |
|---|---|---|
| JP | 2011-098607 A | 5/2011 |
| JP | 2013-159241 A | 8/2013 |

* cited by examiner

*Primary Examiner* — Thomas J Williams
(74) *Attorney, Agent, or Firm* — Oliff PLC (57) ABSTRACT

A negative pressure controller controls a negative pressure in a vacuum chamber of a vacuum booster by controlling a negative pressure supplier connected to the vacuum chamber. The negative pressure controller includes: negative pressure sensors each configured to detect the negative pressure in the vacuum chamber; and a negative-pressure-supplier controller configured to actuate the negative pressure supplier when one of output values of the negative pressure sensors which is nearest to an atmospheric pressure among the output values becomes nearer to an atmospheric pressure than a first threshold value. The negative-pressure-supplier controller is configured to stop the negative pressure supplier when at least two output values of the output values of the negative pressure sensors become nearer to a vacuum than a second threshold value.

6 Claims, 11 Drawing Sheets

NEGATIVE PRESSURE CONTROLLER

CROSS REFERENCE TO RELATED APPLICATION

The present application claims priority from Japanese Patent Application No. 2015-190784, which was filed on Sep. 29, 2015, the disclosure of which is herein incorporated by reference in its entirety.

BACKGROUND

Technical Field

The following disclosure relates to a negative pressure controller configured to control a negative pressure in a vacuum chamber in a vacuum booster.

Description of the Related Art

Patent Document 1 (Japanese Patent Application Publication No. 2013-159241) discloses a negative pressure controller configured to control a negative pressure in a vacuum chamber in a vacuum booster by controlling a vacuum pump connected to the vacuum chamber. This negative pressure controller includes two negative pressure sensors for detecting the negative pressure in the vacuum chamber. A predetermined one of the two negative pressure sensors is selected, and the vacuum pump is controlled based on an output value of the selected negative pressure sensor (see the paragraphs [0029] and [0030]). When an absolute value of a difference between output values of the two sensors is larger than or equal to a failure determination value, it is detected that there is a malfunction in at least one of the sensors (see the paragraph [0038]). It is then determined whether an absolute value of a difference between (i) an estimate value of an amount of change in a pressure (an estimated amount of change) in the case where the vacuum pump is operated and (ii) an amount of actual change in each of the output values of the negative pressure sensors falls within a normal range. It is determined that there is a malfunction in a sensor in which the absolute value of the difference does not fall within the normal range (see the paragraphs [0043]-[0045]). Patent Document 2 (Japanese Patent Application Publication No. 2011-098607) discloses a malfunction detector configured to detect a malfunction in a negative pressure sensor. In the case where an output signal of a negative pressure sensor is to be changed by, e.g., operation of a brake pedal, when the output signal does not change, this malfunction detector detects a malfunction in the negative pressure sensor (see the paragraph [0032]).

SUMMARY

Accordingly, an aspect of the disclosure relates to a negative pressure controller configured to control a negative pressure in a vacuum chamber in a vacuum booster based on output values of a plurality of negative pressure sensors and capable of reducing a shortage of a negative pressure in the vacuum chamber.

In one aspect of the disclosure, a negative pressure controller is configured to actuate a negative pressure supplier based on a value nearest to an atmospheric pressure among output values of a plurality of negative pressure sensors. For example, it is determined whether an actuation condition is satisfied based on the value nearest to the atmospheric pressure among the output values of the plurality of negative pressure sensors. When the actuation condition is satisfied, the negative pressure supplier is actuated.

EFFECTS

According to the one aspect of the disclosure, it is possible to reliably prevent a shortage of a negative pressure in a vacuum chamber. Even in the event of a malfunction in which at least one of the plurality of negative pressure sensors outputs a value nearer to a vacuum than an actual pressure, it is possible to actuate the negative pressure supplier as in the case where the plurality of negative pressure sensors are normal, resulting in reduction in shortage of the negative pressure in the vacuum chamber.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
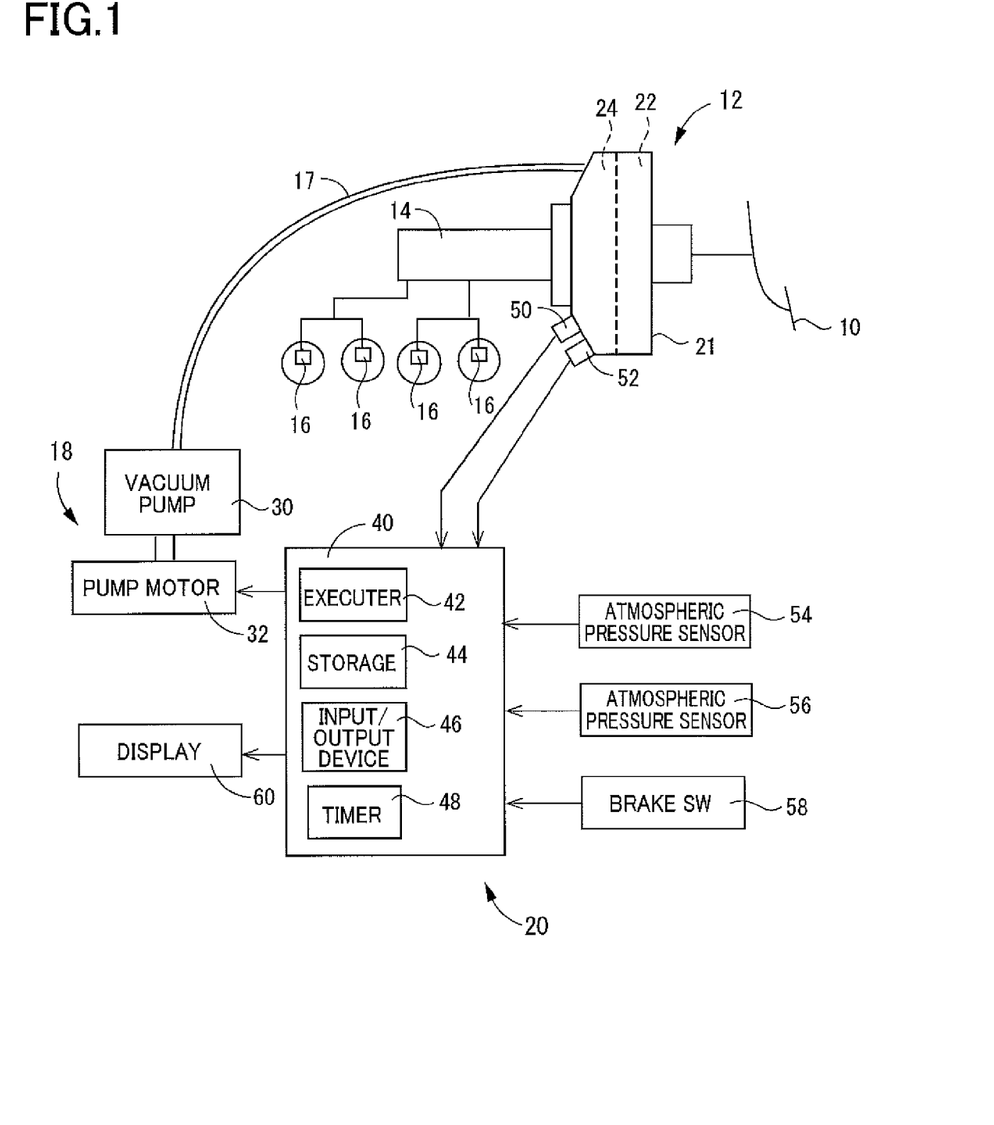
FIG. 1 is a conceptual view of a hydraulic braking system including a negative pressure controller according to a first embodiment.

As illustrated in FIG. 1, a hydraulic braking system includes: a brake pedal 10 as a brake operating member; a vacuum booster 12; a master cylinder 14; brake cylinders 16 of hydraulic brakes provided respectively for a plurality of wheels of a vehicle; a negative pressure supplier 18 connected to the vacuum booster 12 via a vacuum hose 17; and a negative pressure controller 20 according to one embodiment which controls the negative pressure supplier 18. When the brake pedal 10 is depressed, the vacuum booster 12 boosts an operating force and outputs the boosted force to the master cylinder 14. In the master cylinder 14, a hydraulic pressure is produced in accordance with the output of the booster 12 and supplied to the brake cylinders 16. The hydraulic pressures in the respective brake cylinders 16 actuate the respective hydraulic brakes to restrain rotation of the respective wheels.

The booster 12 includes a housing 21 and a booster piston, not illustrated. The booster piston is coupled to the brake pedal 10 and holds a partition. This partition divides the interior of the housing 21 into two chambers. One of the chambers which is nearer to the brake pedal 10 is an apply chamber (a pressure change chamber) 22. The other of the chambers which is nearer to the master cylinder 14 is a vacuum chamber 24. In a state in which the brake pedal 10 is not operated, the apply chamber 22 and the vacuum chamber 24 communicate with each other. In this state, a pressure in the apply chamber 22 and a negative pressure in the vacuum chamber 24 are equal to each other. The negative pressure is a pressure which is nearer to a vacuum than the atmospheric pressure. When the booster piston is moved forward. by depression of the brake pedal 10, the apply chamber 22 is isolated from the vacuum chamber 24 and communicates with the atmosphere. The pressure in the apply chamber 22 is brought closer to the atmospheric pressure (that is, an absolute pressure in the apply chamber 22 increases), so that a difference between the pressure in the apply chamber 22 and the pressure in the vacuum chamber 24 becomes equal to a magnitude related to a braking operation force. An assisting force related to the braking operation force is applied to the booster piston and output to a pressurizing piston of the master cylinder 14. The volume of the vacuum chamber 24 decreases with forward movement of the booster piston. Thus, the negative pressure in the vacuum chamber 24 is brought closer to the atmospheric pressure (that is, an absolute pressure in the vacuum chamber 24 increases) with depression of the brake pedal 10. The negative pressure in the vacuum chamber 24 is kept constant while the operating force acting on the brake pedal 10 is constant. When the depression of the brake pedal 10 is released, however, the apply chamber 22 is isolated from the atmosphere and communicates with the vacuum chamber 24, so that the negative pressure in the vacuum chamber 24 is brought closer to the atmospheric pressure.

The negative pressure supplier 18, which is connected to the vacuum chamber 24, includes a vacuum pump 30 and a pump motor 32 that drives the vacuum pump 30. The pump motor 32 is controlled by a motor ECU 40. The motor ECU 40 is constituted mainly by a computer and includes an executer 42, a storage 44, an input/output device 46, and a timer 48. Devices connected to the input/output device 46 include two negative pressure sensors 50, 52, two atmospheric pressure sensors 54, 56, a brake switch 58, the pump motor 32, and a display 60. The brake switch 58 detects depression of the brake pedal 10. The display 60 displays information relating to malfunctions in the negative pressure sensors 50, 52.

Each of the negative pressure sensors 50, 52 detects the negative pressure in the vacuum chamber 24. Each of the negative pressure sensors 50, 52 may output an absolute value of a gage pressure as a negative pressure and may output an absolute pressure. In the present embodiment, each of the negative pressure sensors 50, 52 outputs the absolute value of the gage pressure, and the absolute value of the gage pressure will be hereinafter referred to as "negative pressure". That is, the negative pressure is a positive value which increases with decrease in difference between the negative pressure and a vacuum, assuming that the atmospheric pressure is zero. The negative pressure is calculated by subtracting the absolute pressure in the vacuum chamber 24 from the atmospheric pressure (the absolute pressure). The atmospheric pressure sensors 54, 56 may be provided in the interior of the vehicle and may be provided near the booster 12, for example. Instead of providing, a single negative pressure sensor and a single atmospheric pressure sensor, the two negative pressure sensors 50, 52 and the two atmospheric pressure sensors 54, 56 are provided for higher level of safety. Malfunctions in the two sensors rarely occur at the same time. It is noted that the atmospheric pressure sensors 54, 56 are not essential, but in the case where each of the negative pressure sensors 50, 52 is configured to output the absolute pressure, the negative pressure as the absolute pressure of the gage pressure can be obtained by subtracting a detection value of each of the negative pressure sensors 50, 52 from a detection value of the atmospheric pressure sensors 54, 56. For example, an average value of detection values of the atmospheric pressure sensors 54, 56 may be used as the detection value of the atmospheric pressure sensors 54, 56.

In the present embodiment, the negative pressure in the vacuum chamber 24 is controlled so as to be kept within a predetermined set range. When a smaller one of output values of the respective negative pressure sensors 50, 52 (i.e., one of the output values which is nearer to the atmospheric pressure) becomes lower than a lower limit value of the set range, namely, a first threshold value (Pthon), it is determined that an actuation condition is satisfied, and the pump motor 32 is actuated. When a smaller one of the two output values becomes higher than an upper limit value of the set range, namely, a second threshold value (Pthoff), in other words, when both of the output values of the respective negative pressure sensors 50, 52 become higher than the second threshold value, it is determined that a stop condition is satisfied, and the pump motor 32 is stopped. The set range may be a range of the negative pressure that is required for the boost of the braking operation force. Also, this control may be referred to as "low-select control". It is noted that the stop condition may be a condition that an increase gradient of each of the output values of the respective negative pressure sensors 50, 52 becomes smaller than a threshold value. This is because an increase gradient of the negative pressure in the vacuum chamber 24 is large when the negative pressure in the vacuum chamber 24 is near the atmospheric pressure, but the increase gradient of the negative pressure in the vacuum chamber 24 is small when the negative pressure in the vacuum chamber 24 is near the vacuum. Also, the stop condition may be a condition that each of the output values becomes higher than the second threshold value Pthoff, and the increase gradient becomes small, for example.

In the event of a malfunction in at least one of the two negative pressure sensors 50, 52, the pump motor 32 is stopped forcibly. Even in the case where a malfunction determination time Tther has passed from a time point in which a larger one of the output values of the respective negative pressure sensors 50, 52 becomes higher than the second threshold value Pthoff, when both of the output values of the respective negative pressure sensors 50, 52 are not higher than the second threshold value Pthoff, a malfunction flag is switched to ON. The pump motor 32 is stopped when the malfunction determination time Tther has passed from the time point in which it is determined that a malfunction occurs in at least one of the two negative pressure sensors 50, 52.

Figure 2:
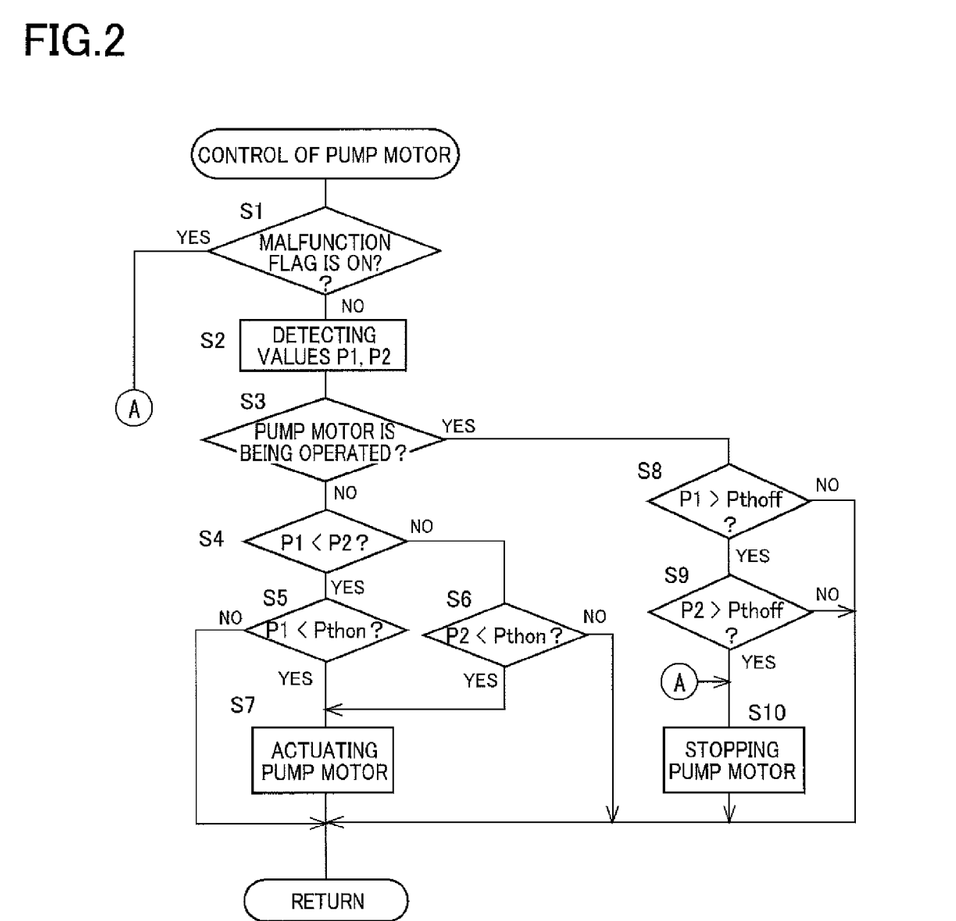
FIG. 2 is a flow chart illustrating a motor control program stored in a storage of a motor ECU of the negative pressure controller.

There will be next explained control of the pump motor 32 with reference to FIG. 2. When a motor control program in FIG. 2 is executed, it is determined at S1 whether the malfunction flag is ON. When the malfunction flag is OFF, an output value P1 of the negative pressure sensor 50 and an output value P2 of the negative pressure sensor 52 are obtained at S2. At S3, it is determined whether the pump motor 32 is in an operating state. When the pump motor 32 is not in the operating state, it is determined whether the actuation condition is satisfied. When the pump motor 32 is in the operating state, it is determined whether the stop condition is satisfied.

When the pump motor 32 is not in the operating state, the output value P1 and the output value P2 are compared with each other at S4. Specifically, it is determined whether the output value P1 is less than the output value P2. When the output value P1 is smaller than the output value P2, it is determined at S5 whether the output value P1 is smaller than the first threshold value Pthon. When the output value P2 is smaller than or equal to the output value P1, it is determined at S6 whether the output value P2 is smaller than the first threshold value Pthon. When a smaller one of the output value P1 and the output value P2 is larger than or equal to the first threshold value Pthon, a negative decision (NO) is made at S5 or S6, and the processings at S1-S5 or S1-S4 and S 6 are repeated. When the smaller one of the output values P1, P2 becomes smaller than the first threshold value Pthon, it is determined that the actuation condition is satisfied, and the pump motor 32 is actuated at S7. In the next processing at S3, a positive decision (YES) is made at S3 because the pump motor 32 is in the operating state. It is determined at S8 whether the output value P1 is larger than the second threshold value Pthoff. It is determined at S9 whether the output value P2 is larger than the second threshold value Pthoff. When at least one of the output values P1, P2 is smaller than or equal to the second threshold value Pthoff, the processings at 51-3, and S8 or the processings at S1-3, S8, and S9 are repeated. When both of the output values P1, P2 become larger than the second threshold value Pthoff, the pump motor 32 is stopped at S10. When the malfunction flag is switched to ON, a positive decision (YES) is made at S1, and the pump motor 32 is stopped at S10.

Figure 3:
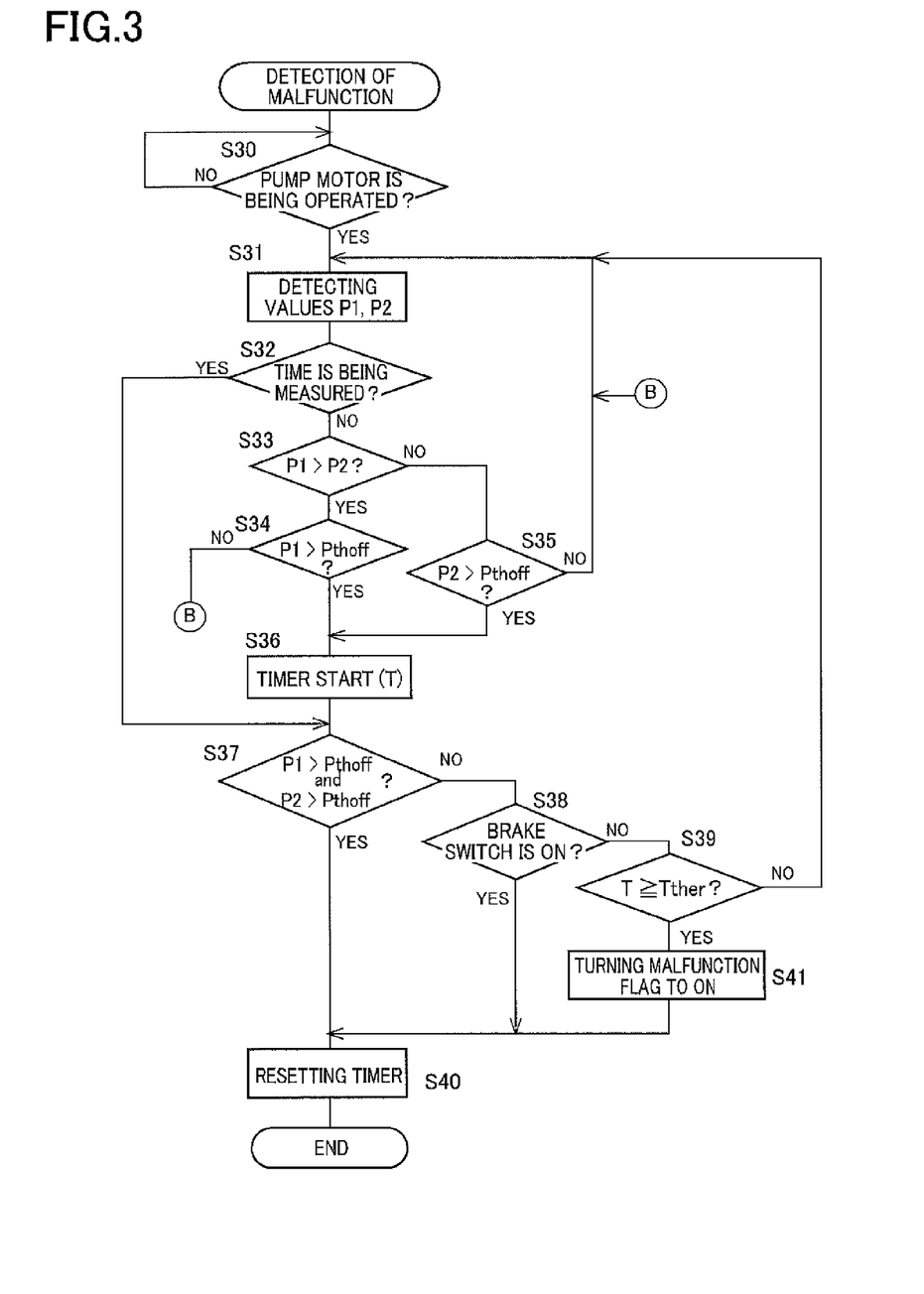
FIG. 3 is a flow chart illustrating a malfunction detecting program stored in the storage.

There will be next explained detection of malfunction with reference to FIG. 3. When a malfunction detecting program in FIG. 3 is executed, it is determined at S30 whether the pump motor 32 is in the operating state. When the pump motor 32 is in the operating state, the output values P1, P2 of the respective negative pressure sensors 50, 52 are obtained at S31. At S32, it is determined whether a time is being measured by the timer 48. The timer 48 measures a time for detecting whether the time has passed the malfunction determination time Tther. When a larger one of the two output values P1, P2 becomes larger than the second threshold value Pthoff, the timer 48 starts time measurement. When the time is not being measured by the timer 48, it is determined at S33-S35 whether the larger one of the output values P1, P2 becomes larger than the second threshold value Pthoff. When the output value P1 is larger than the output value P2, it is determined whether the output value P1 becomes larger than the second threshold value Pthoff. When the output value P2 is larger than the output value P1, it is determined whether the output value P2 becomes larger than the second threshold value Pthoff. When each of the output values P1, P2 is smaller than or equal to the second threshold value Pthoff, the processings at S31-S34 or the processings S31-S33 and S35 are repeated. When the larger one of the output values P1, P2 becomes larger than the second threshold value Pthoff, the timer 48 starts time measurement at S36 (TIMER START).

At S37, it is determined whether both of the output values P1, P2 of the respective negative pressure sensors 50, 52 are larger than the second threshold value Pthoff, that is, it is determined whether the stop condition is satisfied. At S38, it is determined whether the brake switch 58 is ON. At S39, it is determined whether the time T measured by the timer 48 has reached the malfunction determination time Tther. A negative decision (NO) is made in each of the processings at S37-S39, this flow returns to S31. In this case, since the timer 48 is performing time measurement, a positive decision (YES) is made at S32, and the processings at S37-S39 are executed without execution of the processings at S33-S36. That is, the processings at S31, S32, and S37-S39 are repeated, and the pump motor 32 is continuously operated. For example, in the case where both of the output values P1, P2 of the respective negative pressure sensors 50, 52 become larger than the second threshold value Pthoff before the time T measured by the timer 48 has reached the malfunction determination time Tther, a positive decision (YES) is made at S37, and the tinier 48 is reset at S40, and the present routine ends. In this case, the malfunction flag is kept at OFF, and it is not determined that a malfunction occurs in at least one of the negative pressure sensors 50, 52. In the case where neither of the output values P1, P2 of the respective negative pressure sensors 50, 52 is larger than the second threshold value Pthoff, when the brake switch 58 is switched to ON during time measurement of the timer 48, a positive decision (YES) is made at S38, the timer 48 is reset at S40, and the present routine ends. This is because it is difficult to accurately detect malfunctions in the negative pressure sensors 50, 52 when the negative pressure in the vacuum chamber 24 is changed by an operation of the brake pedal 10 after the start of time measurement of the timer 48. In this case, the detection of malfunction is terminated, and the malfunction flag is kept at OFF.

When the time measured by the timer 48 has reached the malfunction determination time Tther before both of the output values P1, P2 of the respective negative pressure sensors 50, 52 become larger than the second threshold value Pthoff, a positive decision (YES) is made at S39, and the malfunction flag is switched to ON at S41. That is, it is determined that a malfunction occurs in at least one of the negative pressure sensors 50, 52. When the malfunction flag is thus turned to ON, a positive decision (YES) is made at S1 in the flow chart in FIG. 2, and the pump motor 32 is stopped at S10. That is, the pump motor 32 is stopped, without the need for both of the output values P1, P2 of the respective negative pressure sensors 50, 52 to become larger than the second threshold value Pthoff. It is noted that when the malfunction flag is switched to ON, the display 60 displays information indicating that a malfunction occurs in at least one of the negative pressure sensors 50, 52.

Figure 4:
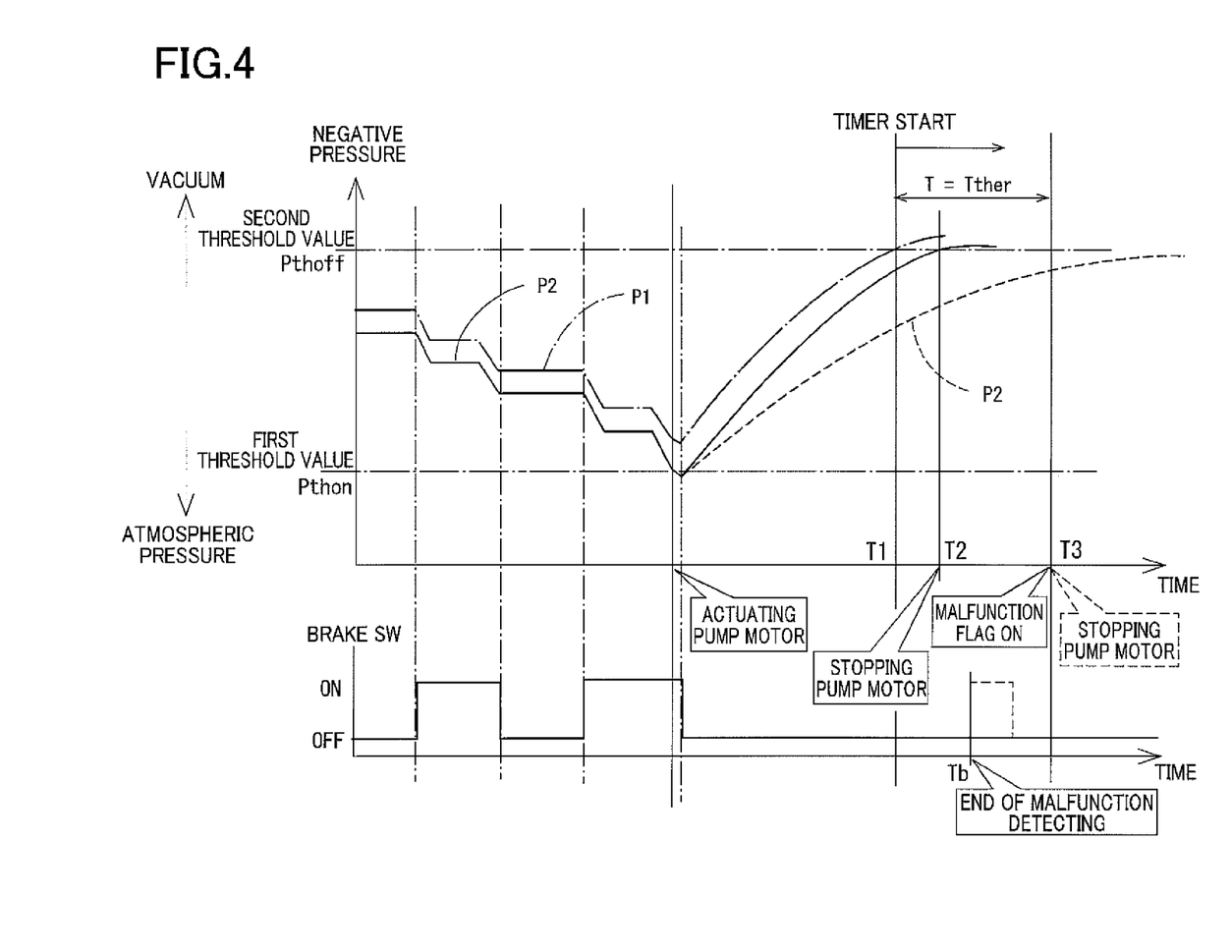
FIG. 4 is a view illustrating changes in output values of negative pressure sensors of the negative pressure controller.

FIG. 4 illustrates one example of changes in the output values P1, P2 of the respective negative pressure sensors 50, 52. Since the negative pressure in the vacuum chamber 24 is consumed by depression of the brake pedal 10 to lower the negative pressure, as illustrated in FIG. 4, both of the output value P1 indicated by the one-dot chain line and the output value P2 indicated by the solid line become smaller. When a smaller one of the output values P1, P2 of the respective negative pressure sensors 50, 52, e.g., the output value P2 indicated by the solid line becomes smaller than the first threshold value Pthon, the pump motor 32 is actuated. The operation of the vacuum pump 30 increases the negative pressure in the vacuum chamber 24. When both of the output values P1, P2 of the respective negative pressure sensors 50, 52 become larger than the second threshold value Pthoff, the pump motor 32 is stopped. The timer 48 starts time measurement from the time T1 at which a larger one of the output values of the respective negative pressure sensors 50, 52, i.e., the output value P1 indicated by the one-dot chain line becomes higher than the second threshold value Pthoff. In the case where the output value P2 indicated by the solid line also becomes larger than the second threshold value Pthoff, (that is, both of the output values P1, P2 become larger than the second threshold value Pthoff) before the malfunction determination time Tther has passed, the pump motor 32 is stopped at the time T2. In the case where the output value P2 is changed as indicated by the broken line, in contrast, the output value P2 is not larger than the second threshold value Pthoff (that is, both of the output values P1, P2 are not larger than the second threshold value Pthoff) at the time T3 that is a time point when the malfunction determination time Tther is elapsed after the time T1. In other words, the stop condition is not satisfied at the time T3. At the time T3, however, the malfunction flag is switched to ON at S41. Thus, the positive decision (YES) is made at SI, and the pump motor 32 is stopped at S10. It is noted that in the case where the brake switch 58 is switched to ON (the time Tb) after the timer 48 starts time measurement, the time measurement of the timer 48 is terminated. The detection of malfunction is terminated, and the malfunction flag is kept at OFF. It is noted that the pump motor 32 is never stopped because the brake switch 58 is switched to ON.

In the present embodiment as described above, the low-select control is executed. Thus, in the case where the negative pressure in the vacuum chamber 24 has lowered, the pump motor 32 can be quickly actuated, thereby reliably preventing shortage of the negative pressure. Even in the event of a malfunction in which one of the negative pressure sensors 50, 52 outputs a relatively large value, the pump motor 32 can be operated as in the case of a normal situation, thereby reliably reducing the shortage of the negative pressure. As a result, it is possible to prevent deterioration of the boosting function of the booster 12, thereby preventing ineffective braking.

In the present embodiment, even in the case where the malfunction determination time Tther has passed (T3) from the time T1 at which a larger one of the output values P1, P2 becomes larger than the second threshold value Pthoff, when a smaller one of the output values P1, P2 does not become larger than the second threshold value Pthoff, that is, when both of the output values P1, P2 do not become larger than the second threshold value Pthoff, the pump motor 32 is stopped. Thus, even if the timing when both of the output values P1, P2 become larger than the second threshold value Pthoff is delayed due to a malfunction of a sensor that outputs a smaller one of the output values of the respective negative pressure sensors 50, 52, it is possible to appropriately stop the pump motor 32, thereby reliably preventing an excessively long time of operation of the pump motor 32. As a result, it is possible to reduce lowering of the durability of the pump motor 32, thereby preventing loss of energy consumption.

In the present embodiment, as described above, the negative pressure controller 20 is constituted by the motor ECU 40, the negative pressure sensors 50, 52, and the brake switch 58, for example. A negative-pressure-supplier controller is constituted by the negative pressure sensors 50, 52, the brake switch 58, and portions of the motor ECU 40 which store and execute the motor control program illustrated in FIG. 2, for example. A forcible stopper is constituted by portions of the negative pressure controller 20 which store and execute the processings at S1 and S10, for example. A malfunction detector is constituted by the negative pressure sensors 50, 52 and portions of the motor ECU 40 which store and execute the malfunction detecting program illustrated in FIG. 3. A measurement discontinuer is constituted by the brake switch 58 and portions of the motor ECR 40 which store and execute the processings at S38 and S40. Also, the malfunction determination time corresponds to a first set length of time.

Second Embodiment

Figure 5:
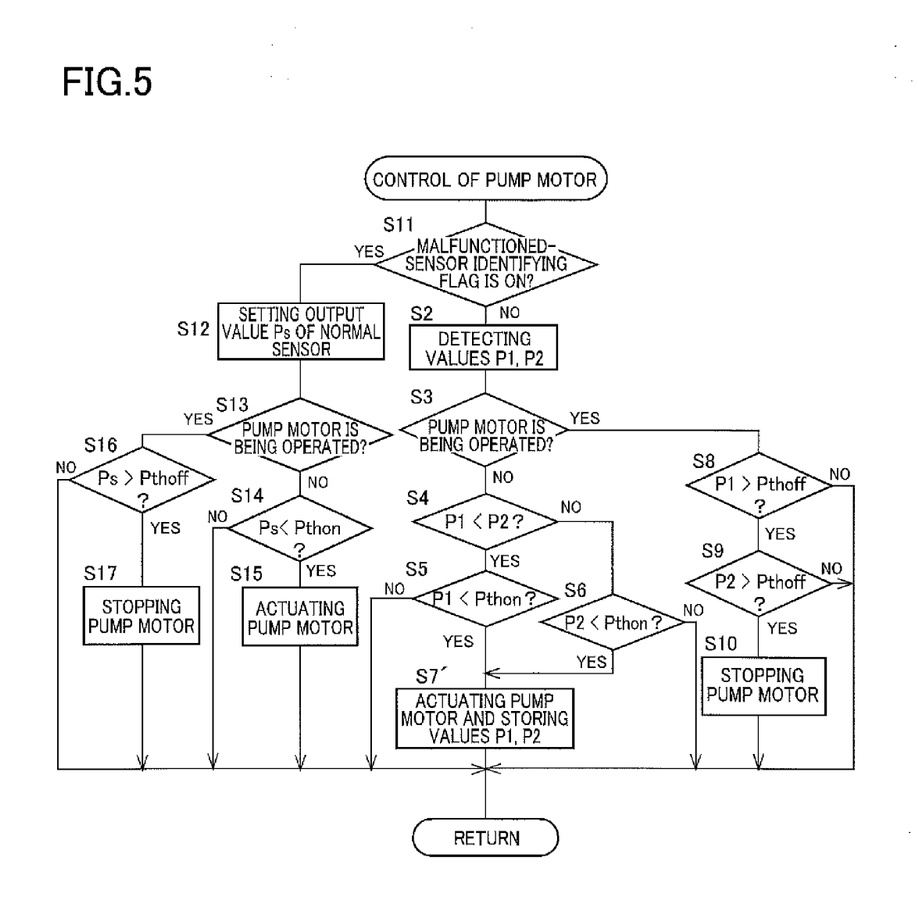
FIG. 5 is a flow chart illustrating a motor control program stored in a storage of a motor ECU of a negative pressure controller according to a second embodiment.
Figure 6:
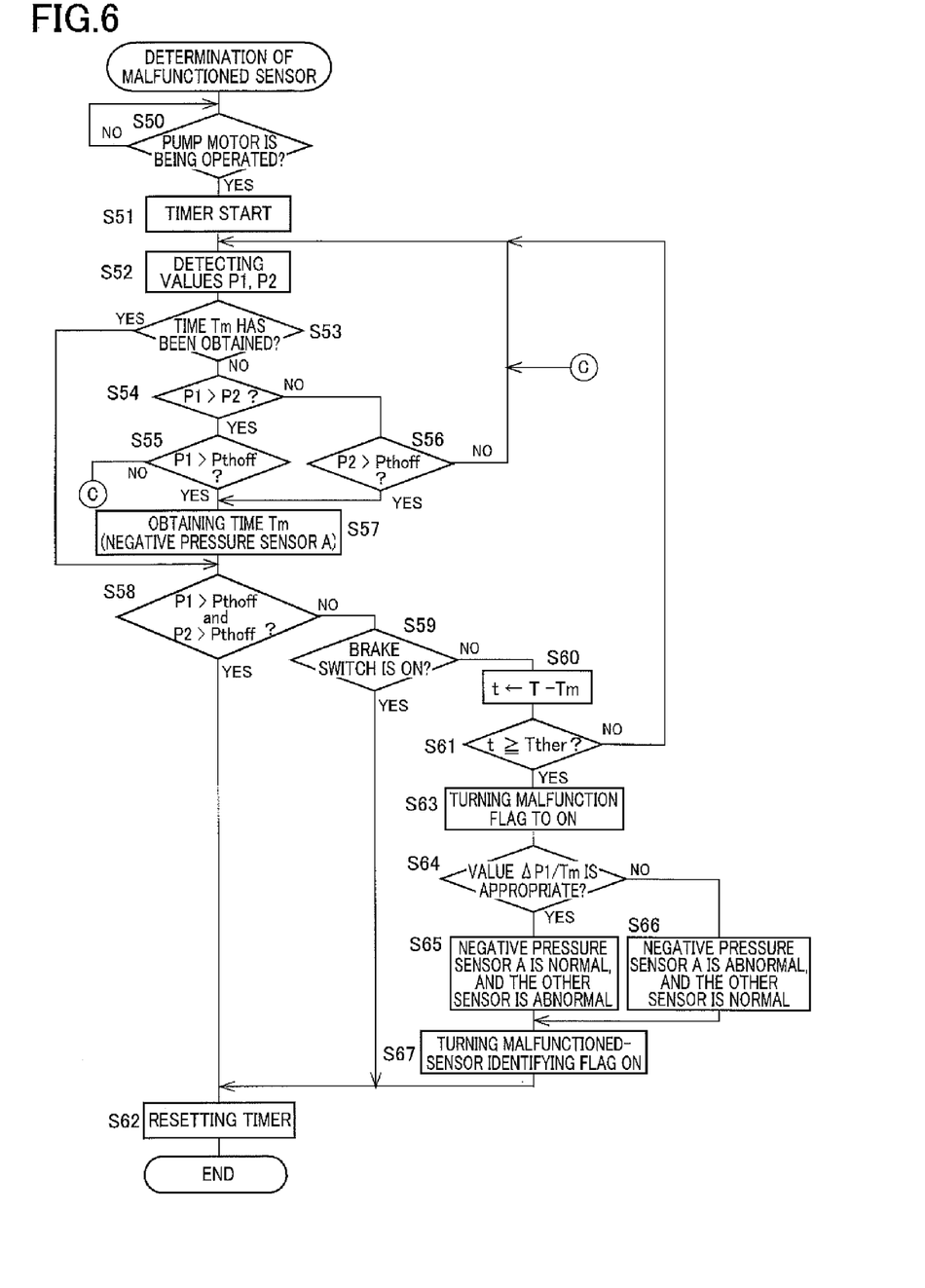
FIG. 6 is a flow chart illustrating a malfunctioned-sensor identifying program stored in the storage in the second embodiment.
Figure 7:
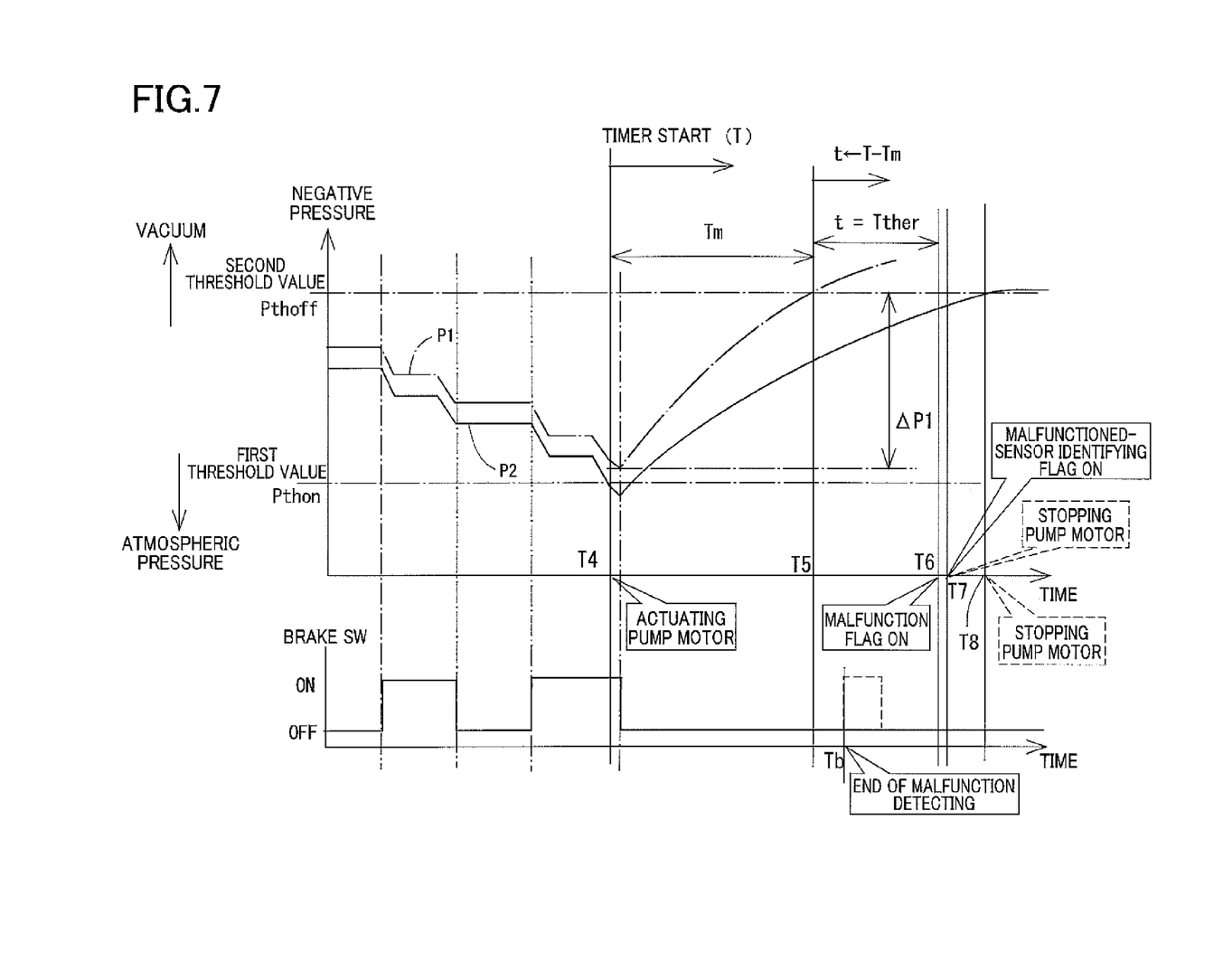
FIG. 7 is a view illustrating changes in output values of negative pressure sensors of the negative pressure controller according to the second embodiment.

In a second embodiment, when it is determined that a malfunction occurs in at least one of the negative pressure sensors 50, 52, the malfunctioned negative pressure sensor is identified, and the pump motor 32 is controlled based on the output value of the normal negative pressure sensor. Malfunctions in the negative pressure sensors 50, 52 rarely occur at the same time as described above. Thus, it is possible to consider that one of the negative pressure sensors is normal. FIGS. 5-7 illustrate one example of control in the second embodiment. Control of the pump motor 32 will be explained with reference to FIG. 5. It is determined at S11 whether a malfunctioned-sensor identifying flag is ON. In this processing, it is determined whether a malfunction occurs in one of the negative pressure sensors 50, 52, and the malfunctioned sensor is identified. When the malfunctioned-sensor identifying flag is OFF, the pump motor 32 is controlled at S2-S10. In the present embodiment, when the pump motor 32 is actuated at S7', the detection values P1, P2 at this time point are stored. When the malfunctioned-sensor identifying flag is ON, the pump motor 32 is controlled based on an output value of a normal negative pressure sensor. For example, in the case where a malfunction occurs in the negative pressure sensor 52, and the negative pressure sensor 50 is normal, the output value P1 is at S12 set to an output value Ps of the normal sensor. When the pump motor 32 is not in the operating state, it is determined at S14 and S15 whether the output value Ps is smaller than the first threshold value Pthon. When the output value Ps is smaller than the first threshold value Pthon, the pump motor 32 is actuated. When the pump motor 32 is in the operating state, it is determined at S16 and S17 whether the output value Ps is larger than the second threshold value Pthoff. When the output value Ps is larger than the second threshold value Pthoff, the pump motor 32 is stopped.

Identification of the malfunctioned sensor will be explained with reference to FIG. 6. It is determined at S50 whether the pump motor 32 is in the operating state. When the pump motor 32 is in the operating state, the timer 48 starts time measurement at S51 (TIMER START). At S52, the output values P1, P2 of the respective negative pressure sensors 50, 52 are obtained. At S53, it is determined whether a time Tm has been obtained. The time Tm is a length of time from the actuation of the pump motor 32 to a time point when one of the output values P1, P2 becomes larger than the second threshold value Pthoff. Thus, when both of the output values P1, P2 are smaller than or equal to the second threshold value Pthoff, it is determined at S54, S55, and S56 whether a larger one of the output values P1, P2 becomes larger than the second threshold value Pthoff. When both of the output values P1, P2 are smaller than or equal to the second threshold value Pthoff, the processings at S52-S55 or the processings at S52-554 and S56 are repeated. When a larger one of the output values P1, P2 becomes larger than the second threshold value Pthoff, the time Tm is obtained and stored at S57, and one of the output values P1, P2 which has become larger than the second threshold value Pthoff is stored. That is, one of the negative pressure sensors 50, 52 which has output the output value larger than the second threshold value Pthoff is stored. For example, when the output value P1 of the negative pressure sensor 50 at S55 becomes larger than the second threshold value Pthoff, and a processing at S57 is executed, the negative pressure sensor 50 is stored as a negative pressure sensor A.

At S58, it is determined whether both of the output values PI, P2 of the respective negative pressure sensors 50, 52 become larger than the second threshold value Pthoff. At S59, it is determined whether the brake switch 58 is switched to ON. At S60 and S61, it is determined whether a time t obtained by subtracting the time Tm from the time T measured by the timer 48 has reached the malfunction determination time Tther.

$$t = T - Tm$$

$$t \geq Tther$$

When negative decisions (NO) are made in all the processings at S58, S59, and S61, this routine returns to S52. In this case, the time Tm has already been obtained, and accordingly the processings at S58-S61 are executed without execution of the processings at S54-S57.

The timer 48 is reset at S62 when both of the output values PI, P2 of the respective negative pressure sensors 50, 52 have become larger than the second threshold value Pthoff (S55: YES) before the time t has reached the malfunction determination time Tther or when the brake switch 58 is switched to ON (S59: YES) before the time t has reached the malfunction determination time Tther. In this case, the present routine ends, with each of the malfunction flag and the malfunctioned-sensor identifying flag being kept at OFF. On the other hand, when the malfunction determination time Tther has passed before both of the output values P1, P2 of the respective negative pressure sensors 50, 52 become larger than the second threshold value Pthoff, a positive decision (YES) is made at S61. The malfunction flag is switched to ON at S63. At S64, an increasing rate dP1 of the negative pressure per unit time ($=\Delta P1/Tm$) is obtained based on the time Tm obtained at S57, the value P1 stored at S7', and the second threshold value Pthoff, and it is determined whether an absolute value of a difference between the increasing rate dP1 and an estimated increasing rate dP1* determined based on, e.g., operating states of the pump motor 32 and the brake pedal 10 is smaller than or equal to a set value $\delta$.

$$\Delta P1 = Pthoff - P1 \text{ (the value stored in S7')}$$

$$dP1 = \Delta P1 / Tm$$

$$|dP1 - dP1*| \leq \delta$$

When the absolute value of the difference is smaller than or equal to the set value $\delta$, it is possible to consider that the output value P1 of the negative pressure sensor 50 has substantially changed as estimated based on the operating states of the pump motor 32 and the brake pedal 10. Thus, it is determined at S65 that the negative pressure sensor A (the negative pressure sensor 50) is normal, and the negative pressure sensor 52 is abnormal. When the absolute value of the difference is larger than the set value $\delta$, it is possible to consider that the output value P1 of the negative pressure sensor 50 is changed as not estimated. Thus, it is determined at S66 that the negative pressure sensor 50 is abnormal, and the negative pressure sensor 52 is normal. At S67, the malfunctioned-sensor identifying flag is switched to ON. The timer 48 is then reset at S62, and the present routine ends.

FIG. 7 illustrates one example of changes in the output values P1, P2 of the respective negative pressure sensors 50, 52. In FIG. 7, the timer 48 starts time measurement at the time T4 at which a smaller one of the output values P1, P2 becomes smaller than the first threshold value Pthon. At the time T5, the output value P1 of the negative pressure sensor 50 becomes larger than the second threshold value Pthoff before the output value P2 of the negative pressure sensor 52, and it is detected whether both of the output values P1, P2 of the respective negative pressure sensors 50, 52 become larger than the second threshold value Pthoff. In this case, both of the output values P1, P2 are not larger than the second threshold value Pthoff at the time T6 that is a time point when the malfunction determination time Tther is elapsed after the time T5. The malfunction flag is switched to ON. The malfunctioned negative pressure sensor is then identified, and the malfunctioned-sensor identifying flag is switched to ON at the time T7. A difference between the time T6 and the time T7 is small. For example, when the malfunctioned-sensor identifying flag is switched to ON, and the negative pressure sensor 50 is identified to be malfunctioned (S66), a positive decision (YES) is made at S11, and the output value P2 of the negative pressure sensor 52 is at S12 set to the normal output value Ps. the pump motor 32 is at S17 stopped at the time T8 at which the output value Ps becomes larger than the second threshold value Pthoff. On the other hand, when the negative pressure sensor 52 is identified to be malfunctioned (S65), the output value P1 is set to the output value Ps, but the output value Ps has already been larger than the second threshold value Pthoff, and accordingly a positive decision (YES) is immediately made at S16. The pump motor 32 is stopped at the time T7. By identifying the malfunctioned sensor as described above, it is possible to reliably stop the pump motor 32 even if there is a malfunction in the negative pressure sensor that outputs a smaller output value.

In the present embodiment as described above, the negative-pressure-supplier controller is constituted by the negative pressure sensors 50, 52, the brake switch 58, and portions of the motor ECU 40 which store and execute the motor control program in FIG. 5, for example. A malfunction-identification controller is constituted by portions of the negative-pressure-supplier controller which store and execute the processings at S12-517, for example. A malfunctioned-sensor identifier and the malfunction detector are constituted by the negative pressure sensors 50, 52, the brake switch 58, and portions of the motor ECU 40 which store and execute the malfunctioned-sensor identifying program in FIG. 6, for example. The measurement discontinuer is constituted by portions of the motor ECU 40 which store and execute the processings at S59 and S62, for example. In the present embodiment, a second set length of time corresponds to the malfunction determination time.

Third Embodiment

Figure 8:
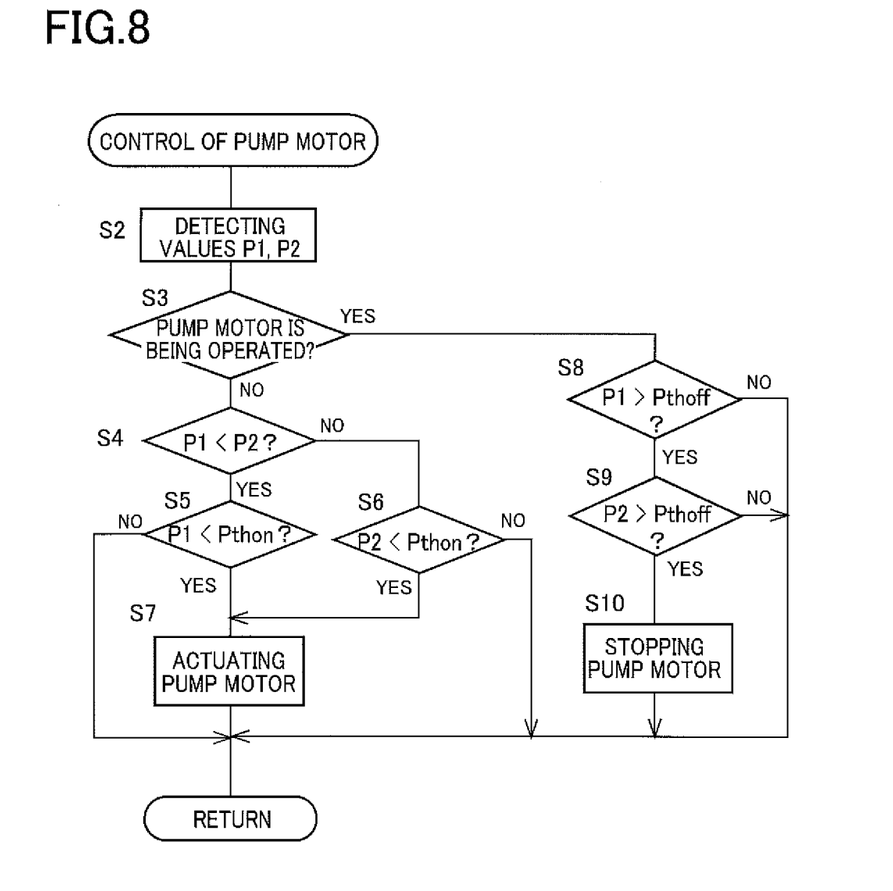
FIG. 8 is a flow chart illustrating a motor control program stored in a storage of a motor ECU of a negative pressure controller according to a third embodiment.
Figure 9:
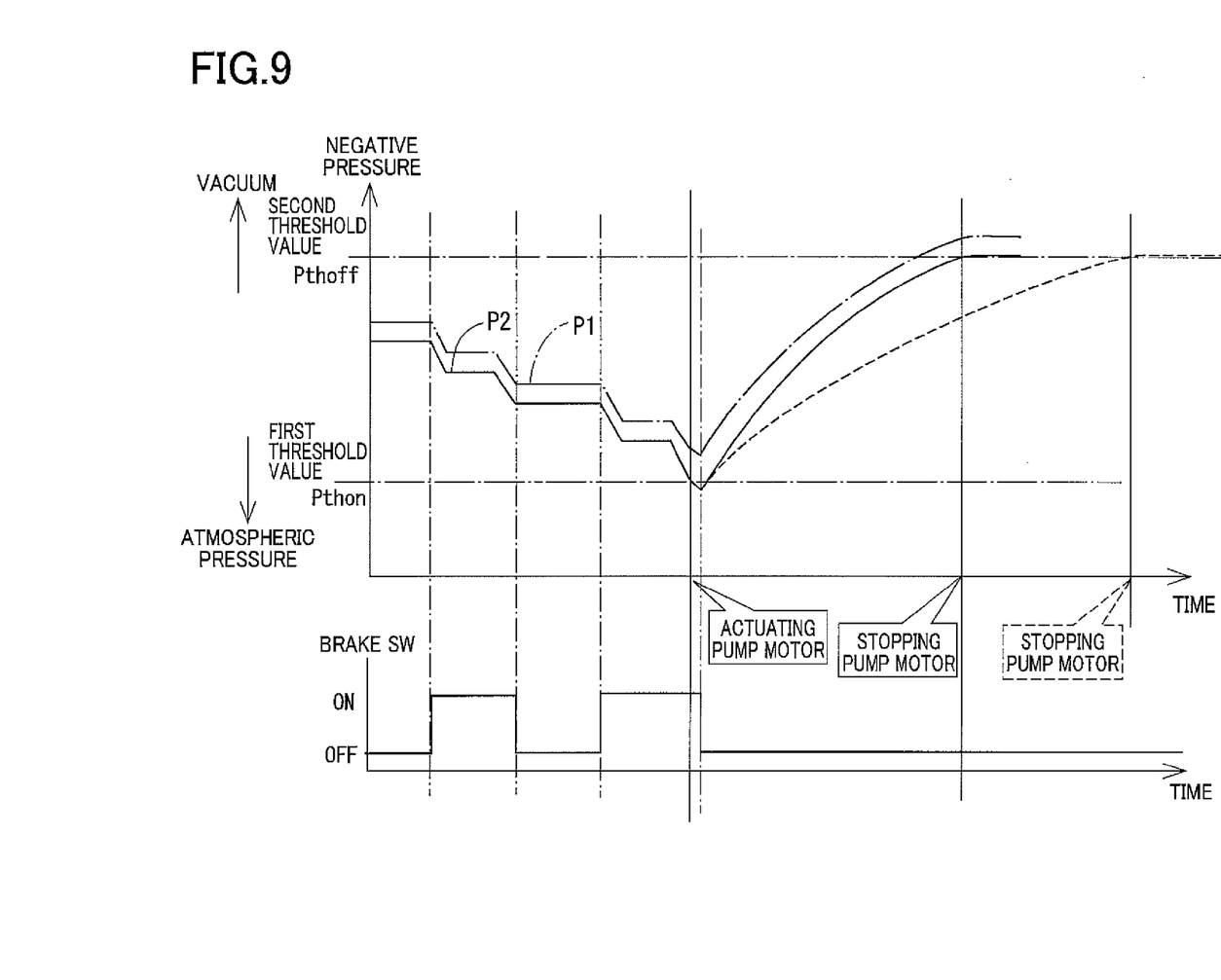
FIG. 9 is a view illustrating changes in output values of negative pressure sensors of the negative pressure controller according to the third embodiment.

In a third embodiment, the low-select control is executed without execution of the detection of malfunction in the negative pressure sensors 50, 52. As illustrated in FIG. 8, as in the first embodiment, the processings at S2-S10 are executed in which when a smaller one of the output values P1, P2 of the respective negative pressure sensors 50, 52 becomes smaller than the first threshold value Pthon, the pump motor 32 is actuated, and when both of the output values P1, P2 become larger than the second threshold value Pthoff, the pump motor 32 is stopped. FIG. 9 illustrates one example of changes in the negative pressure sensors 50, 52 in the present embodiment. As illustrated in FIG. 9, the pump motor 32 is stopped when both of the output values P1, P2 become equal to the second threshold value Pthoff.

Fourth Embodiment

Figure 10:
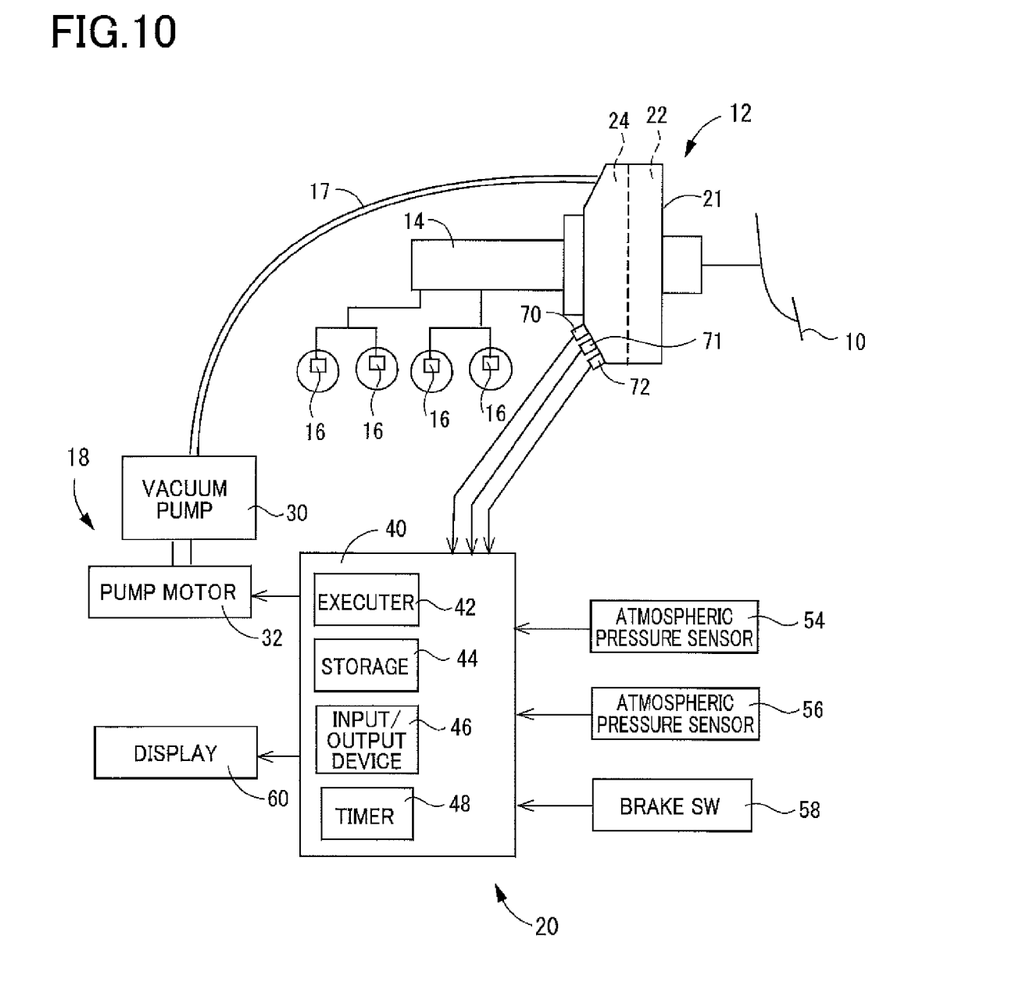
FIG. 10 is a conceptual view of a hydraulic braking system including a negative pressure controller according to a fourth embodiment.
Figure 11A:
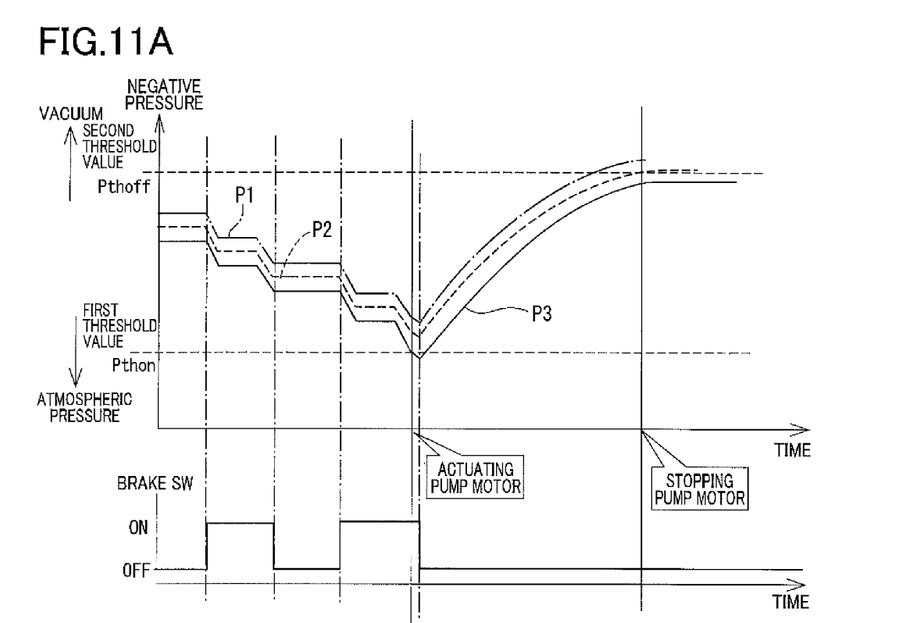
FIG. 11A is a view illustrating changes in output values of negative pressure sensors of the negative pressure controller according the fourth embodiment.

In a fourth embodiment, as illustrated in FIG. 10, three negative pressure sensors 70, 71, 72 are provided on the vacuum chamber 24. As illustrated in FIG. 11A, when the smallest one of output values P1, P2, P3 of the respective negative pressure sensors 70, 71, 72 becomes smaller than the first threshold value Pthon, the pump motor 32 is actuated, and when two of the three output values P1, P2, P3 become larger than the second threshold value Pthoff, the pump motor 32 is stopped. This configuration can reliably prevent the shortage of the negative pressure in the vacuum chamber 24. It is noted that the pump motor 32 may be stopped when all the three output values P1, P2, P3 become larger than the second threshold value Pthoff.

Figure 11B:
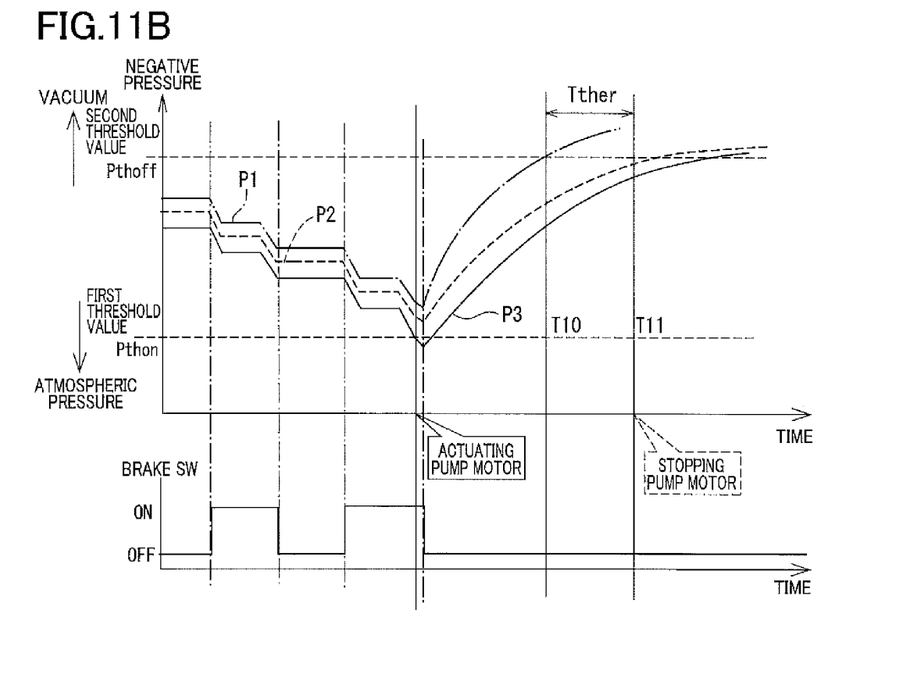
FIG. 11B is a view illustrating changes in output values of negative pressure sensors in a state different from a state in FIG. 11A.

In FIG. 11B, the output value P1 is the largest among the three output values P1, P2, P3. As illustrated in FIG. 11B, it is detected that there is a malfunction in at least one of the three negative pressure sensor 70-72, when neither of the output values P2, P3 becomes larger than the second threshold value Pthoff during the malfunction determination time Tther started from the time T10 at which the largest output value P1 becomes larger than the second threshold value Pthoff. By applying the first embodiment to this embodiment, the pump motor 32 may be stopped at the time T11 at which the malfunction determination time Tther has passed. By applying the second embodiment to this embodiment, a malfunctioned negative pressure sensor may be identified to stop the pump motor 32 based on an output value of a normal negative pressure sensor. Other modifications may be applied to this fourth embodiment.

It is noted that any method may be used to identify a malfunctioned negative pressure sensor. For example, a malfunctioned negative pressure sensor may be identified by comparing an actual output value and an estimate value with each other or by comparing an actual amount of change in the output value and an estimated amount of change in the output value. It is to be understood that the disclosure is not limited to the details of the illustrated embodiments, but may be embodied with various changes and modifications, which may occur to those skilled in the art, without departing from the spirit and scope of the disclosure.

Claimable Inventions

There will be described inventions recognized to be claimable in the present application and features of the inventions.

(1) A negative pressure controller configured to control a negative pressure in a vacuum chamber of a vacuum booster by controlling a negative pressure supplier connected to the vacuum chamber, the negative pressure controller, comprising:

a plurality of negative pressure sensors each configured to detect the negative pressure in the vacuum chamber; and a negative-pressure-supplier controller configured to actuate the negative pressure supplier when one of output values of the plurality of negative pressure sensors which is nearest to an atmospheric pressure among the output values becomes nearer to an atmospheric pressure than a first threshold value, the negative-pressure-supplier controller being configured to stop the negative pressure supplier when at least two output values of the output values of the plurality of negative pressure sensors become nearer to a vacuum than a second threshold value.

The negative pressure supplier may include a vacuum pump and a pump motor for driving the vacuum pump, for example. An absolute value of a gage pressure is a value obtained by subtracting an absolute pressure in the vacuum chamber from an absolute pressure representing an atmospheric pressure and increases (as a positive value) with the gage pressure getting nearer to the vacuum and with the atmospheric pressure being zero. In the case where the negative pressure is represented by the absolute value of the gage pressure, the second threshold value is larger than the first threshold value. In this case, when the smallest one of the output values of the plurality of negative pressure sensors becomes smaller than the first threshold value, the negative pressure supplier is actuated. When the at least two output values become larger than the second threshold value, the negative pressure supplier is stopped. Also, the absolute value of the gage pressure may be obtained based on the atmospheric pressure and an absolute pressure of the output value of the negative pressure sensor in the case where the output value of the negative pressure sensor is the absolute pressure. The atmospheric pressure is an output value (an absolute pressure) of an atmospheric pressure sensor or an estimate value based on, e.g., a height above the sea level. In the case where the negative pressure is represented by the absolute pressure, the second threshold value is smaller than the first threshold value. In this case, when a larger one of the output values of the plurality of negative pressure sensors becomes larger than the first threshold value, the negative pressure supplier is actuated, and when the at least two output values become smaller than the second threshold value, the negative pressure supplier is stopped.

(2) The negative pressure controller according to the above form (1), wherein the negative-pressure-supplier controller comprises a forcible stopper configured to stop the negative pressure supplier when a first set length of time is elapsed from a time point at which an output value nearest to the vacuum among the output values of the plurality of negative pressure sensors becomes nearer to the vacuum than the second threshold value, even when the at least two output values have not become nearer to the vacuum than the second threshold value.

(3) The negative pressure controller according to the above form (1) or (2), further comprising a malfunction detector configured to detect a malfunction in at least one negative pressure sensor of the plurality of negative pressure sensors when the at least two output values have not become nearer to the vacuum than the second threshold value when a second set length of time is elapsed from a time point at which an output value nearest to the vacuum among the output values of the plurality of negative pressure sensors becomes nearer to the vacuum than the second threshold value.

(4) The negative pressure controller according to the above form (1) or (2), wherein the output values of the plurality of negative pressure sensors comprise a first output value and a second output value, wherein the first output value is nearest to the vacuum among the output values of the plurality of negative pressure sensors, and the second output value is second nearest to the vacuum among the output values of the plurality of negative pressure sensors, and wherein the negative pressure controller further comprises a malfunction detector configured to detect a malfunction in at least one of one of the plurality of negative pressure sensors which has output the first output value and another of the plurality of negative pressure sensors which has output the second output value when a length of time from a time point at which the first output value has become nearer to the vacuum than the second threshold value to a time point at which the second output value has become nearer to the vacuum than the second threshold value is greater than or equal to a second set length of time.

(5) The negative pressure controller according to the above form (3) or (4), further comprising a malfunctioned-sensor identifier configured to, when the malfunction detector detects a malfunction in the at least one negative pressure sensor, identify the at least one negative pressure sensor in which the malfunction has occurred, as the malfunctioned at least one negative pressure sensor.

For example, when an absolute value of a difference between (i) an estimate value of an amount of change in a negative pressure which is determined by an operating state of the negative pressure supplier and/or an operation state of a brake operating member and (ii) an amount of change in an actual output value is greater than a threshold value, it may be determined that a malfunction occurs in a negative pressure sensor having output the output value. Also, when an absolute value of a difference between (i) an estimate value of the negative pressure which is determined by the operating state of the negative pressure supplier and/or the operation state of the brake operating member and (ii) the actual output value is greater than a threshold value, it may be determined that a malfunction occurs in a negative pressure sensor having output the output value.

(6) The negative pressure controller according to the above form (5), wherein the negative-pressure-supplier controller comprises a malfunction-identification controller configured to, when the malfunctioned-sensor identifier identifies the malfunctioned at least one negative pressure sensor, control the negative pressure supplier based on at least one output value of at least one of the plurality of negative pressure sensors except the identified malfunctioned at least one negative pressure sensor.

(7) The negative pressure controller according to any one of the above forms (2) through (6), wherein the vacuum booster is operable by an operation of a brake operating member, wherein the negative pressure in the vacuum chamber changes with the operation of the brake operating member, wherein the negative pressure controller is configured to perform measurement of an elapsed time from a time point at which an output value nearest to the vacuum among the at least two output values becomes nearer to the vacuum than the second threshold value, and wherein the forcible stopper comprises a first measurement discontinuer configured to discontinue the measurement of the elapsed time when the operation of the brake operating member is performed before the elapsed time reaches the first set length of time.

(8) The negative pressure controller according to any one of the above forms (3) through (7), wherein the vacuum booster is operable by an operation of a brake operating member, wherein the negative pressure in the vacuum chamber changes with the operation of the brake operating member, wherein the negative pressure controller is configured to perform measurement of an elapsed time from a time point at which an output value nearest to the vacuum among the at least two output values becomes nearer to the vacuum than the second threshold value, and wherein the malfunction detector comprises a second measurement discontinuer configured to discontinue the measurement of the elapsed time when the operation of the brake operating member is performed before the elapsed time reaches the second set length of time.

(9) A negative pressure controller configured to control a negative pressure in a vacuum chamber of a vacuum booster by controlling a negative pressure supplier connected to the vacuum chamber, the negative pressure controller, comprising:

a plurality of negative pressure sensors each configured to detect the negative pressure in the vacuum chamber; and a negative-pressure-supplier controller configured to actuate the negative pressure supplier when an actuation condition is satisfied based on one of output values of the plurality of negative pressure sensors which is nearest to an atmospheric pressure among the output values, the negative-pressure-supplier controller being configured to stop the negative pressure supplier when a stop condition is satisfied based on at least two output values of the output values of the plurality of negative pressure sensors.

It is noted that examples of the stop condition include: a condition in which an absolute value of a gradient of change in each of the at least two output values has decreased by greater than or equal to a set value; and a condition in which the absolute value of the gradient of change has decreased by greater than or equal to the set value, and a state in which the absolute value of the gradient of change is small has continued for greater than or equal to a set time.

The technical feature according to any one of the above forms (1) through (8) may be incorporated into the negative pressure controller according to this form.

What is claimed is:

1. A negative pressure controller configured to control a negative pressure in a vacuum chamber of a vacuum booster by controlling a negative pressure supplier connected to the vacuum chamber, the negative pressure controller, comprising:

a plurality of negative pressure sensors each configured to detect the negative pressure in the vacuum chamber; and a negative-pressure-supplier controller configured to actuate the negative pressure supplier when one of output values of the plurality of negative pressure sensors which is nearest to an atmospheric pressure among the output values becomes nearer to an atmospheric pressure than a first threshold value, the negative-pressure-supplier controller being configured to stop the negative pressure supplier when at least two output values of the output values of the plurality of negative pressure sensors become nearer to a vacuum than a second threshold value.

2. The negative pressure controller according to claim 1, wherein the negative-pressure-supplier controller comprises a forcible stopper configured to stop the negative pressure supplier when a first set length of time is elapsed from a time point at which an output value nearest to the vacuum among the output values of the plurality of negative pressure sensors becomes nearer to the vacuum than the second threshold value, even when the at least two output values have not become nearer to the vacuum than the second threshold value.

3. The negative pressure controller according to claim 1, further comprising a malfunction detector configured to detect a malfunction in at least one negative pressure sensor of the plurality of negative pressure sensors when the at least two output values have not become nearer to the vacuum than the second threshold value when a second set length of time is elapsed from a time point at which an output value nearest to the vacuum among the output values of the plurality of negative pressure sensors becomes nearer to the vacuum than the second threshold value.

4. The negative pressure controller according to claim 3, further comprising a malfunctioned-sensor identifier configured to, when the malfunction detector detects a malfunction in the at least one negative pressure sensor, identify the at least one negative pressure sensor in which the malfunction has occurred, as the malfunctioned at least one negative pressure sensor.

5. The negative pressure controller according to claim 4, wherein the negative-pressure-supplier controller comprises a malfunction-identification controller configured to, when the malfunctioned-sensor identifier identifies the malfunctioned at least one negative pressure sensor, control the negative pressure supplier based on at least one output value of at least one of the plurality of negative pressure sensors except the identified malfunctioned at least one negative pressure sensor.

6. The negative pressure controller according to claim 3,
wherein the vacuum booster is operable by an operation of a brake operating member,
wherein the negative pressure in the vacuum chamber changes with the operation of the brake operating member,
wherein the malfunction detector is configured to perform measurement of an elapsed time from a time point at which an output value nearest to the vacuum among the at least two output values becomes nearer to the vacuum than the second threshold value, and
wherein the malfunction detector comprises a measurement discontinuer configured to discontinue the measurement of the elapsed time when the operation of the brake operating member is performed before the elapsed time reaches the second set length of time.

* * * * *